United States Patent
Shuen et al.

(10) Patent No.: US 7,590,120 B2
(45) Date of Patent: Sep. 15, 2009

(54) ENHANCED MULTICAST VLAN REGISTRATION

(75) Inventors: Pauline Shuen, Palo Alto, CA (US); James P. Rivers, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 663 days.

(21) Appl. No.: 11/283,269

(22) Filed: Nov. 18, 2005

(65) Prior Publication Data

US 2007/0116014 A1    May 24, 2007

(51) Int. Cl.
*H04L 12/56* (2006.01)
(52) U.S. Cl. ................... 370/392; 370/395.53
(58) Field of Classification Search .......... None
See application file for complete search history.

(56) References Cited

U.S. PATENT DOCUMENTS

| | | | |
|---|---|---|---|
| 5,959,989 A * | 9/1999 | Gleeson et al. ............. 370/390 |
| 6,216,167 B1 | 4/2001 | Momorov | |
| 6,766,482 B1 | 7/2004 | Yip | |
| 6,785,274 B2 * | 8/2004 | Mahajan et al. ............. 370/390 |
| 6,804,194 B1 | 10/2004 | Kadambi | |
| 6,804,236 B1 * | 10/2004 | Mahajan et al. ............. 370/390 |
| 6,912,589 B1 * | 6/2005 | Jain et al. ................... 709/238 |
| 2003/0165119 A1 | 9/2003 | Hsu | |
| 2005/0180345 A1 * | 8/2005 | Meier ......................... 370/310 |

OTHER PUBLICATIONS

Cisco Systems, Inc., Configuring IGMP Snooping and MVR, Chapter 11, Catalyst 2950 Desktop Switch Software Configuration Guide, downloaded from the Internet, Mar. 2002.

* cited by examiner

*Primary Examiner*—Jayanti K Patel
*Assistant Examiner*—Jung Park
(74) *Attorney, Agent, or Firm*—Charles E. Krueger

(57) ABSTRACT

A method and apparatus utilized in layer 2 access switches of an Ethernet ring-based network to bridge multicast packets between a multicast VLAN and a selected VLAN coupled to a VLAN trunk port of the layer 2 access switch. The duplication of multicast streams over the ring technology is avoided while maintaining isolation between subscribers.

5 Claims, 4 Drawing Sheets

ENHANCED MULTICAST VLAN REGISTRATION

BACKGROUND OF THE INVENTION

Multicast VLAN Registration (MVR) is an innovative feature that is key for metro service providers interested in delivering residential voice and video services. MVR involves the creation of separate dedicated VLANs constructed specifically for multicast traffic distribution. When deployed, each switch that receives a multicast stream from the multicast VLAN will examine each multicast group and will internally bridge the multicast VLAN traffic to the particular subscriber's VLAN.

Multicast VLAN Registration (MVR) is designed for applications using wide-scale deployment of multicast traffic across an Ethernet ring-based service provider network (for example, the broadcast of multiple television channels over a service-provider network). MVR allows a subscriber on a port to subscribe and unsubscribe to a multicast stream on the network-wide multicast VLAN.

FIG. 1 depicts a ring network topology that can utilize MVR and FIG. 2 depicts three access switches (A, B, and C) included in the topology of FIG. 1. Although the ring topology saves costs when constructing a network the trunk lines between the switches form a bandwidth bottleneck. Accordingly, techniques for efficiently utilizing available bandwidth are critical when using the ring topology.

An important requirement for the metro network is to ensure that one subscriber does not see the traffic generated by another subscriber or targeted for another subscriber via only layer 2 connectivity without any filtering based on layer 3 and beyond information. Administrators of the network may have different access control configuration for each user depending on the type of service subscribed. Communication between any two subscriber ports should only be possible via a device which can filter based on layer 3 and beyond information.

However, subscriber ports on the same layer 2 access switch can still communicate with each other through layer 2 only connectivity. In switches manufactured by the assignee of the present application the protected port feature isolates subscriber ports on the same switch. No unicast, multicast or broadcast traffic is forwarded between protected ports at layer 2, all communication between these ports is only possible through a layer 3 device.

A protected port does not forward any traffic (unicast, multicast or broadcast) to any other port that is also a protected port.

When a router receives a multicast packet it sends a copy of the packet to each connected VLAN having member of the multicast group. Because subscribers connected to different layer 2 access switches belong to different VLANs (a VLAN maps to a IP subnet), normal usage of IP multicast would result in duplication of subscribed channels for each VLAN. For example, if a first subscriber connected to layer 2 switch A wants to watch channel 1 and a second subscriber connected to layer 2 access switch B also wants to watch channel 1, two streams of channel 1 multicast would be sent through the GE VLAN trunk because each subscriber is on a different VLAN. One stream would be tagged with the VLAN assigned to the first subscriber's port and the other stream would be tagged with the VLAN assigned to the second subscriber's port. As an example, if each video stream were multicast at 5 Mbps duplicating the stream for each subscriber wishing to view the same would waste significant bandwidth.

MVR is designed to eliminate the need to duplicate multicast traffic for a TV channel for subscribers in each VLAN. Using MVR, multicast traffic for all channels is sent only once around the VLAN trunk, specifically only on the multicast VLAN. The layer 2 switches are configured to bridge multicast traffic from the multicast VLAN to the local VLAN defined on the layer 2 switch that includes an authorized subscriber.

Much of the specification for IP Multicasting is defined in the Internet Group Management Protocol (IGMP) in the Internet Task Force Request for Comments (IETF RFC) 1112 which is available on the sis.ohio-state.edu website with the extension /htbin/rfc/rfc112.html.

The Internet Group Management Protocol (IGMP) is used to dynamically register individual hosts in multicast group on a particular VLAN. IGMP v.2 utilizes membership query, membership report, and leave group messages.

Hosts send out a "join" which consists of sending IGMP membership reports corresponding to a particular multicast group to indicate that they are interested in joining that group. The layer 3 device periodically sends out an IGMP membership query to verify that at least one host on the subnet is still interested in receiving traffic directed to that group. When there is no reply to three consecutive IGMP membership queries, the router times out the group and stops forwarding traffic directed toward that group.

The hosts send out a "leave" by using the leave group message to actively communicate to the local multicast layer 3 device their intention to leave the group. The layer 3 device then sends out a group-specific query and determines whether there are any remaining hosts interested in receiving the traffic. If there are no replies, the layer 3 device times out the group and stops forwarding the traffic.

The default behavior for a Layer 2 switch is to forward all multicast traffic to every port that belongs to the destination LAN on the switch. This would defeat the purpose of the switch, which is to limit traffic to the ports that need to receive the data. IGMP snooping is used to efficiently deal with IP multicast in a layer 2 switching environment.

Standard IGMP snooping requires the subscriber switch to examine, or snoop, some Layer 3 information in the IGMP packets sent between the hosts and the router. When the switch hears the IGMP host report from a host for a particular multicast group, the switch adds the host's port number to the associated multicast table entry. When the switch hears the IGMP leave group message from a host, it removes the host's port from the table entry. Because IGMP control messages are transmitted as multicast packets, they are indistinguishable from multicast data at Layer 2. A switch running IGMP snooping examine every multicast data packet to check whether it contains any pertinent IGMP must control information.

In MVR the layer 2 access switches implement an enhanced technique of IGMP snooping to eliminate the need to duplicate multicast traffic for a video stream intended for subscribers in different VLANs. Instead, multicast traffic for all video streams is sent only once around the VLAN trunk, specifically only on the multicast VLAN In order to achieve such functionality, the IGMP joins and leaves coming from a subscriber must look like they were initiated by a port in the multicast VLAN, rather than the VLAN the subscriber is assigned to. These IGMP joins and leaves dynamically register for streams of multicast traffic in the multicast VLAN on the layer 3 distribution layer device. The access layer switch modifies the hardware forwarding behavior to allow the traffic to be forwarded from the multicast VLAN to the subscriber in a different VLAN. This forwarding behavior selectively allows for traffic to cross between two VLANs.

MVR has been utilized advantageously in metro networks and other environments. However, because all subscriber ports of a switch are configured as a single VLAN it is not possible to connect multiple VLANs to a single subscriber ports of the layer 2 access switch. New applications are being developed that require a more flexible topology while maintaining the bandwidth saving advantages of MVR for multicast traffic distribution.

The challenges in the field of IP multicast traffic distribution continue to increase with demands for more and better techniques having greater flexibility and adaptability. Therefore, a need has arisen for a new system and method for distributing IP multicast among subscribers.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
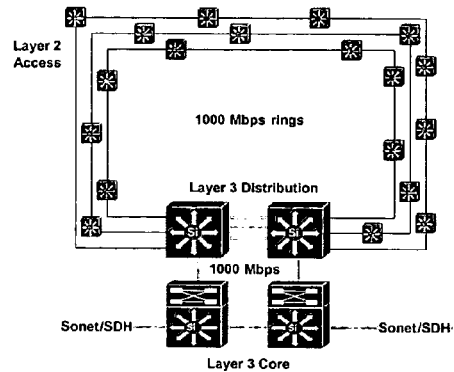
FIG. 1 is a block diagram of an Ethernet ring-based service provider network.
Figure 2:
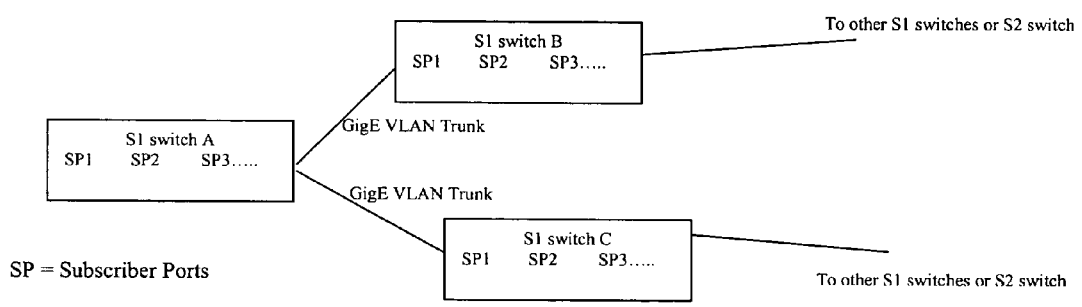
FIG. 2 is a more detailed view of the layer 2 access switches depicted in FIG. 1
Figure 3A:
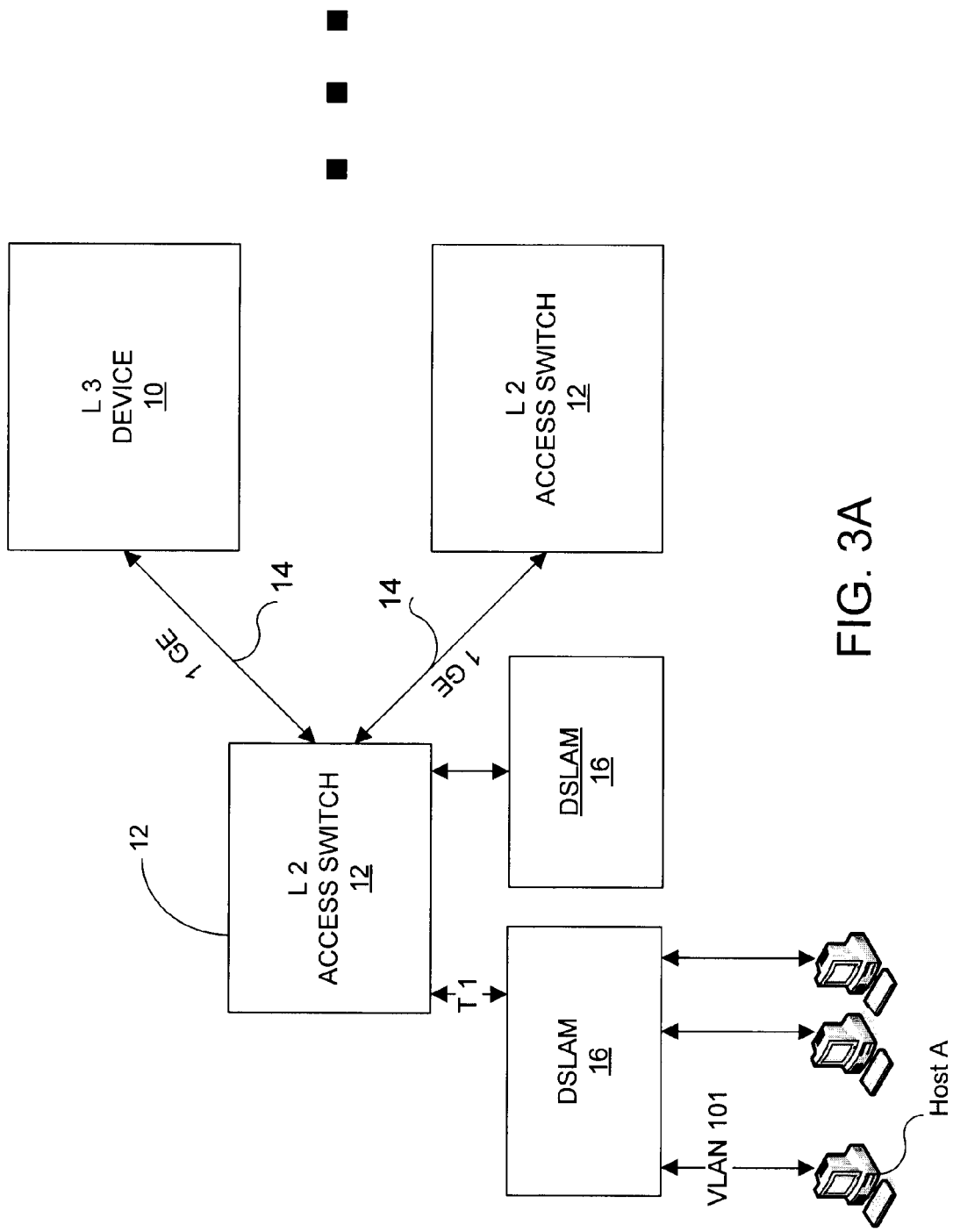
FIG. 3A is a block diagram of a ring-based topology with which an embodiment of the invention can be utilized.

One embodiment of the invention will be described in terms of a network structure in the form of a ring where various switches are coupled by optical fiber trunk lines as depicted in FIG. 3. This embodiment will be described by way of example, not limitation, as a network for connecting DSL (Digital Subscriber Line) subscribers to a network. In FIG. 3 a layer 3 device 10 and group of layer 2 access switches 12 have their ring ports coupled by fiber links 14 to form a ring topology. The fiber links 14 form trunk links between the ring ports and are 1 GE(gigabit Ethernet) links coupling the rings port of the switches. An uplink port of each DSL Access Multiplexer (DSLAM) 16 is coupled to a Trunk port of the layer 2 access switch and each subscriber port of the DSLAM is connected to a host 18 through a DSL modem (not shown). In this example the subscribers are host computers and other devices coupled to the DSL modem.

In this embodiment, each subscriber port on the DSLAM is assigned to a different VLAN. Since a host on one VLAN cannot communicate with a host on another VLAN without a layer 3 device, this VLAN assignment achieves the desired isolation between hosts. Each Trunk port on the layer 2 access switch is configured as a VLAN trunk because it is coupled through the DSLAM to multiple VLANs. As a VLAN trunk port, the different VLANs coupled to the port will be assigned VLAN ids to distinguish between them.

A provider supplies services and content over the network. As compression techniques improve video streams such as movies and television shows will be provided over the network to selected subscribers using DSL modems. Video streams are notorious bandwidth hogs and the preferred technique of delivering these streams is to utilize IP Multicast which enables a source of the video stream to transmit a single copy which is received by a selected group of hosts included in a multicast group.

Figure 3B:
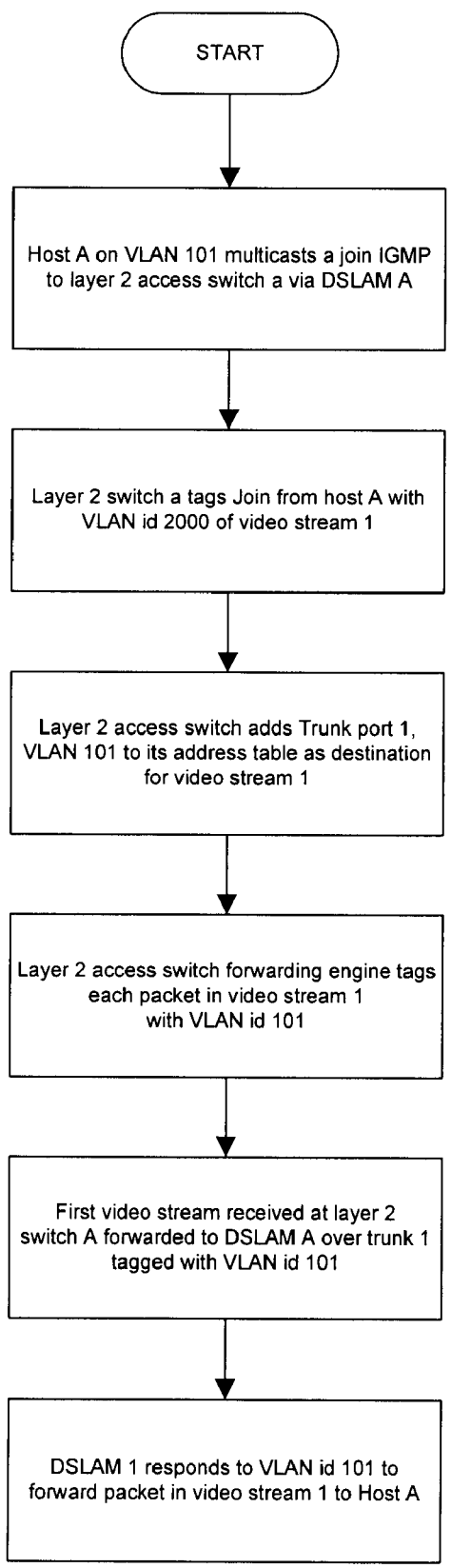
FIG. 3B illustrates a flow chart of an example process.
Figure 4:
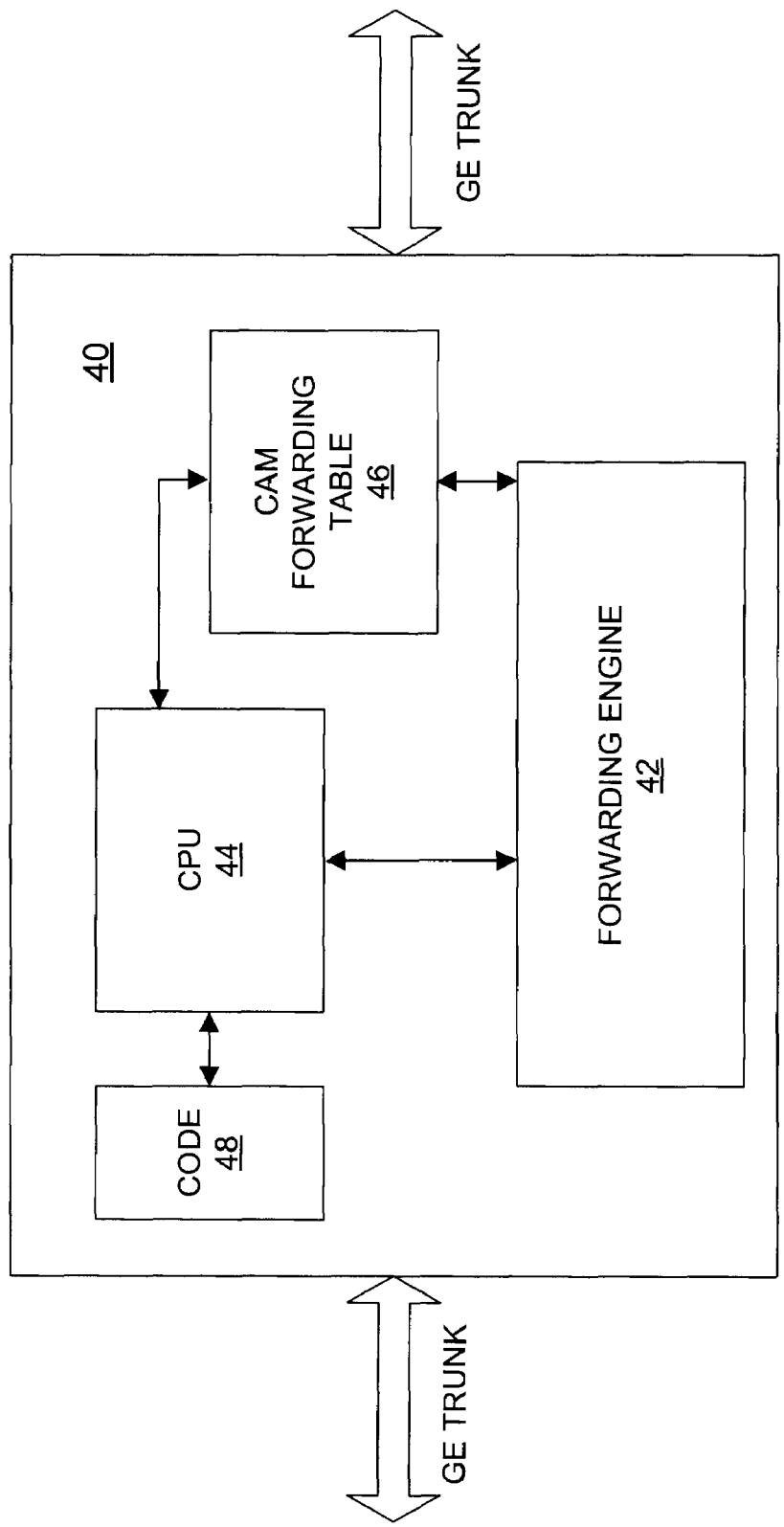
FIG. 4 is a block diagram of the forwarding and control system of a layer 2 access switch.

A more detailed description of the operation of the embodiment will now be provided with reference to FIGS. 3, 3B and 4. In the following it is assumed that that a subscriber is using Host(A) on VLAN101, coupled to subscriber port(A) on a DSLAM(A), which is coupled to VLAN trunk port(A) of layer 2 access switch(A). The subscriber selects a first video stream that having a first multicast MAC address in the configured range of multicast addresses. In this example, the muticast VLAN is tagged with VLAN id 2000.

When a subscriber selects a multicast video, the host(A), coupled to VLAN101, multicasts a join IGMP report to the layer 2 access switch(A) in order to become a receiver of the multicast group. If these IGMP reports are destined for one of the multicast-configured MAC addresses, the layer 2 access switch CPU is the only destination for these reports. The forwarding engine does not forward the IGMP control packets.

FIG. 4 shows a high-level system block diagram of forwarding and control subsystem of the layer 2 access switch that may be used to execute software of an embodiment of the invention. The sub-system 40 includes an ASIC forwarding engine 42, a CPU 44, a forwarding table 46, and memory 48 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave may be the computer readable storage medium.

The CPU 44 tags the join from Host(A) with VLAN id 2000 so that it appear as if the join came from the ring port which is part of the multicast VLAN so that only one copy of data stream is transmitted over the ring. Then, the CPU adds trunk port 1, VLAN101 to its address table in content addressable memory (CAM) as a destination for multicast packets of video stream 1.

The CPU 44 then programs the forwarding engine to tag each received multicast packet on the multicast VLAN in video stream 1 with VLAN id 101 and the packet is switched from the ring port to first VLAN Trunk port. As described above, in this embodiment the Trunk port 1 is configured as a VLAN trunk port so that the received first video stream packet will be forwarded with the VLAN id 101 to DSLAM(A). DLSAM(A) will then respond to the VLAN id 101 to forward the multicast video packet to VLAN 101 where it will be received by host(A).

When the subscriber closes video stream 1, host(A) will send a leave message which is received at the CPU 44 of layer 2 access switch(A). If no other hosts on VLAN 101 are in the multicast group for video stream 1 the layer 2 switch will delete Trunk port 1, VLAN 101 as a destination address for the first video stream and send a leave message, tagged with VLAN id 2000, to the layer 3 device indicating it no longer needs to receive video stream 1 packets.

The invention has now been described with reference to the preferred embodiments. Alternatives and substitutions will now be apparent to persons of skill in the art. For example, an embodiment has been described in the context of a DSL network. However, the trunk ports of the layer 2 access switches could be connected to subscriber premises having a number of VLANs configured to optimize use of resources. Further, although multicasting video streams has been described, persons of skill in the art are aware that the techniques described are applicable to any type of data which is multicast. Accordingly, it is not intended to limit the invention except as provided by the appended claims.

What is claimed is:

1. A method comprising:

configuring first and second ring ports of a first layer 2 access switch to be part of a multicast VLAN, with the multicast VLAN including ring ports on layer 2 access switches and on a layer 3 device included in a network, with the layer 2 access switches and layer 3 network device coupled in a ring topology, where the multicast VLAN is the only VLAN over which multicast data, identified by a first multicast address flows;

configuring a first non-ring port of the first layer 2 access switch as a first Ethernet VLAN trunk port for transmitting traffic between multiple VLANs, where different VLANs are identified by different VLAN id tags and where the first non-ring port of the first layer 2 access switch is coupled by an Ethernet trunk line to first and second hosts included in respective first and second VLANs;

receiving, at the first VLAN Ethernet trunk port of the first layer 2 access switch, a first multicast join message from the first host indicating the first multicast address and including a first VLAN id tag of the first VLAN including the first host;

intercepting the multicast join message at the first layer 2 access switch so that it is not forwarded;

creating a modified first multicast join message, in response to the first multicast join message, indicating that the ring port of the first layer 2 access switch, included in the multicast VLAN, wishes to join a first multicast group that receives multicast packets indicated by the first multicast address;

forwarding the first modified multicast join message to the layer 3 device; and forwarding multicast packets, multicast over the multicast VLAN, to the first Ethernet VLAN trunk port and tagging forwarded multicast packets with the first VLAN id tag.

2. The method of claim 1 where forwarding further comprises:

adding Ethernet VLAN trunk port 1 and the first VLAN id tag to the address table of the first layer 2 access switch as a destination for received first multicast packets.

3. An apparatus comprising:

means for configuring first and second ring ports of a first layer 2 access switch to be part of a multicast VLAN, with the multicast VLAN including ring ports on layer 2 access switches and on a layer 3 device included in a network, with the layer 2 access switches and layer 3 network device coupled in a ring topology, where the multicast VLAN is the only VLAN over which multicast data, identified by a first multicast address, flows;

means for configuring a first non-ring port of the first layer 2 access switch as a first Ethernet VLAN trunk port for transmitting traffic between multiple VLANs, where different VLANs are identified by different VLAN id tags and where the first non-ring port of the first layer 2 access switch is coupled by an Ethernet trunk line to first and second hosts included in respective first and second VLANs;

means for receiving, at the first Ethernet VLAN trunk port of the first layer 2 access switch, a first multicast join message from the first host indicating the first multicast address and including a first VLAN id tag of the first VLAN including the first host;

means for intercepting the multicast join message at the first layer 2 switch so that it is not forwarded;

means creating a modified first multicast join message, in response to the first multicast join message, indicating that the ring port of the first layer 2 access switch, included in the multicast VLAN, wishes to join a first multicast group that receives multicast packets indicated by the first multicast address; and means for forwarding the first modified multicast join message to the layer 3 device; and means for forwarding multicast packets, multicast over the multicast VLAN, to the first Ethernet VLAN trunk port and tagging forwarded multicast packets with the first VLAN id tag.

4. The system of claim 3 where the means for forwarding further comprises:

means for adding Ethernet VLAN trunk port 1 and the first VLAN id tag to the address table of the first layer 2 access switch as a destination for received first multicast packets.

5. An apparatus comprising:

system memory holding executable program code;

a content addressable memory holding a forwarding table;

a forwarding engine;

a processing unit coupled to the system memory, content addressable memory and forwarding table, with the processing unit configured to configure first and second ring ports on a layer 2 access switch to be part of a multicast VLAN including ring ports on layer 2 access switches and on a layer 3 device included in a network, with the layer 2 access switches and layer 3 network device coupled in a ring topology, where the multicast VLAN is the only VLAN over which multicast data, identified by a first multicast address, flows, to configure a first non-ring port of the first layer 2 access switch as a first Ethernet VLAN trunk port for transmitting traffic between multiple VLANs, where different VLANs are identified by different VLAN id tags and where the first non-ring port of the first layer 2 access switch is coupled to first and second hosts included in respective first and second VLANs, to intercept a first multicast join message, received at the Ethernet trunk port of the first layer 2 access device from the first host indicating the first multicast address and including a first VLAN id tag of the first VLAN including the first host, so that the multicast join message is not forwarded, to create a modified first join message, in response to the first multicast join message, indicating that the ring port of the first layer 2 access switch, included in the multicast VLAN, wishes to join a first multicast group that receives multicast packets indicated by the first multicast address, to forward the first modified multicast join message to the layer 3 device, and to forward multicast packets, multicast over the multicast VLAN, to the first VLAN Ethernet trunk port and tagging forwarded multicast packets with the first VLAN id tag.

* * * * *